(12) United States Patent
Voigtlaender et al.

(10) Patent No.: US 6,940,447 B2
(45) Date of Patent: Sep. 6, 2005

(54) RADAR DEVICE AND METHOD FOR OPERATING A RADAR DEVICE

(75) Inventors: Klaus Voigtlaender, Wangen (DE); Guido Villino, Leonberg (DE); Christian Passmann, Wiernsheim (DE); Thomas Meier, Berlin (DE); Dirk Schmid, Simmozheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/416,751

(22) PCT Filed: Oct. 10, 2001

(86) PCT No.: PCT/DE01/03883

§ 371 (c)(1),
(2), (4) Date: Oct. 8, 2003

(87) PCT Pub. No.: WO02/39141

PCT Pub. Date: May 16, 2002

(65) Prior Publication Data

US 2004/0061639 A1 Apr. 1, 2004

(30) Foreign Application Priority Data

Nov. 11, 2000 (DE) .......................... 100 56 002

(51) Int. Cl.$^7$ ............................... G01S 13/93
(52) U.S. Cl. .......................... 342/70; 342/75; 342/107; 342/108; 342/133; 342/139; 342/145; 342/146
(58) Field of Search ............................... 342/70–72, 75, 342/89, 107, 108, 113, 118, 128–130, 133, 135, 139, 145, 146, 154, 158, 201, 202, 204, 368, 371, 372

(56) References Cited

U.S. PATENT DOCUMENTS

| | | | | |
|---|---|---|---|---|
| 3,916,417 A | | 10/1975 | Wong et al. ............... 342/380 |
| 4,051,472 A | * | 9/1977 | Albanese et al. ............ 342/28 |
| 4,184,154 A | * | 1/1980 | Albanese et al. ........... 342/107 |
| 4,277,787 A | * | 7/1981 | King .......................... 342/371 |
| 4,686,533 A | * | 8/1987 | MacDonald et al. ........ 342/373 |
| 4,725,844 A | * | 2/1988 | Goodwin et al. ........... 342/374 |
| 4,814,773 A | * | 3/1989 | Wechsberg et al. ......... 342/368 |
| 4,885,589 A | * | 12/1989 | Edward et al. ............. 342/175 |
| 5,351,053 A | | 9/1994 | Wicks et al. ................ 342/158 |
| 5,424,748 A | | 6/1995 | Pourailly et al. ........... 342/157 |
| RE36,095 E | * | 2/1999 | Urabe et al. ................ 342/133 |
| 6,031,485 A | | 2/2000 | Cellai et al. ................ 342/131 |
| 6,369,748 B1 | * | 4/2002 | Uehara ........................ 342/70 |

OTHER PUBLICATIONS

"Multicarrier radar signals with low peak–to–mean envelope power ratio", Mozeson, E.; Levanon, N.;Radar, Sonar and Navigation, IEE Proceedings—, Vol: 150, Issue: 2, Apr. 2003 Ps:71–77.*

D.R. Billetter, "Multifunction Array Radar", 1989, Artech House, Boston US, p. 161.

* cited by examiner

*Primary Examiner*—John B. Sotomayor
(74) *Attorney, Agent, or Firm*—Kenyon & Kenyon

(57) ABSTRACT

A radar device having means for generating a carrier-frequency signal, means for shaping pulses, means for generating modulated radar pulses from the carrier-frequency signal, means for emitting modulated signals as radar pulses, means for receiving radar pulses and means for processing the received radar pulses. The means for receiving the radar pulses have an array including a plurality of antennas, the means for processing the radar pulses have means for dividing the signal power over at least two different reception branches. Means are provided for generating different directional characteristics in the various reception branches.

28 Claims, 2 Drawing Sheets

RADAR DEVICE AND METHOD FOR OPERATING A RADAR DEVICE

FILED OF THE INVENTION

The present invention relates to a radar device and a received radar pulses. The present invention also relates to a method for operating a radar device.

BACKGROUND INFORMATION

Numerous applications for radar devices are known in widely differing fields of technology. For example, the use of radar devices is possible within the framework of the close-range sensor system in motor vehicles.

When working with radar devices, electromagnetic waves are radiated from a transmitting antenna. If these electromagnetic waves strike an obstacle, they are reflected, and after the reflection, are received again by a different or the same antenna. The received signals are subsequently fed to a signal processing and signal analysis device.

The endeavor is to collect and evaluate as much information as possible about the vehicle surroundings. Such information concerns the measurement of the distance of the motor vehicle to other objects, the measurement of the relative speed between the vehicle and other objects, and an angle measurement with regard to the object to be detected. If possible, these measurement objectives should be achieved with as low an expenditure as possible for equipment, the effort being in particular to realize as many measurement objectives as possible in a single radar device.

These efforts are especially problematic with regard to the measurement of angle information, since conventionally, a triangulation is performed on the basis of measured values from a plurality of spatially distributed sensors.

Possible applications for radar devices concern accident prevention ("precrash"), ACC ("adaptive cruise control") stop & go, park distance control, semi-autonomous parking and detection of the blind spot.

SUMMARY

According to an example embodiment the present invention, a means for receiving the radar pulses has an array including a plurality of antennas, a means for processing the radar pulses has means for dividing the signal power over at least two different reception branches, and means are provided for generating different directional characteristics (radiation patterns) in the various reception branches. Using a radar device of this type, it is possible, for example, to implement a precrash measurement and ACC stop & go simultaneously. The generation of different directional characteristics makes it possible to carry out an optimization with regard to the different demands in the various transmission branches. For example, a precrash measurement must be carried out in an extremely time-critical manner, while angle information, however, is of secondary importance. In contrast thereto, in the case of ACC stop & go, an angular resolution is generally necessary. By making different directional characteristics available, it is therefore possible to dispense with angle information in the reception branch for precrash, which permits an extremely time-critical measurement, while in the reception branch for ACC stop & go, the directional characteristic is selected so that angle information is obtained.

Preferably, the means for emitting radar pulses has a wide directional characteristic. In this way, the entire angular range to be detected is covered.

The means for generating different directional characteristics in the various reception branches preferably generates a swivelling (steerable) directional characteristic in at least one reception branch. This reception branch in which the swivelling directional characteristic is generated may therefore be used for transmitting the angle information. The possibility thus exists, for example, of using the reception branch for ACC stop & go.

It may likewise be advantageous if the means for generating different directional characteristics in the various reception branches generates a wide directional characteristic in at least one reception branch. For applications in which angle information is not of primary importance, a wide directional characteristic is sometimes sufficient. For example, the reception branch having the wide directional characteristic may therefore be used for precrash.

It may likewise be advantageous if at least two different transmission branches are provided, and if means are provided for generating different directional characteristics in the various transmission branches. It is therefore possible to implement different directional characteristics on the transmitter side, as well, and thus to support the advantageous effects of parallel operation for different applications of the radar device. This is particularly advantageous when the radar device uses the same antennas for transmitting and receiving.

The means for generating different directional characteristics preferably has a control unit. Such a control unit receives, for example, signals from the reception branches as input signals. It may also be responsible for the weighting in terms of amplitude and phase, and thus for generating the different directional characteristics.

Means may preferably be provided for generating modulated signals from the carrier-frequency signal, and means may be provided for mixing the delayed, modulated signals with received signals. The radar device may therefore operate according to the correlation method. For instance, the distance of a target object may be inferred by correlation on the basis of the time delay from the emission to the reception of the radar pulses.

It may likewise be preferred that the means for emitting the radar pulses be implemented as a single transmitting antenna. It is thus sufficient that different directional characteristics are generated by an antenna array on the receiver end, while a single transmitting antenna is provided on the transmitter end.

However, it may also be useful if the means for emitting the radar pulses has an array including a plurality of antennas. These antennas may be positioned separate from the antenna array on the receiver end, or they may be identical with the antenna array on the receiver end. Thus, there is great flexibility within the scope of the present invention with respect to the layout of transmitting and receiving antennas.

It may also be advantageous if means are provided for generating a high pulse repetition frequency, and if means are provided for generating a low pulse repetition frequency. The different pulse rates may therefore be utilized for different applications, the different pulse repetition frequencies being used on the various directional characteristics.

The means for generating a low pulse repetition frequency preferably divides the high pulse repetition frequency by a whole number. Pulse repetition frequencies are thereby advantageously available which have an integer relationship. Generating the various pulse repetition frequencies in this manner is also efficient.

It is particularly advantageous if the radar pulses having the wide directional characteristic are emitted with the high pulse repetition frequency, and the radar pulses with the swivelling directional characteristic are emitted with the low pulse repetition frequency. For example, during this operation it is possible to perform the time-critical measurement on the wide directional characteristic using a high pulse repetition frequency, while for the swivelling directional characteristic, which is preferably less time-critical within the framework of the present invention, it is possible to work with the lower pulse repetition frequency.

It may likewise be useful if the radar pulses with the swivelling directional characteristic are emitted using a pulse repetition frequency that is modulated by a PN ("pseudo-noise") code. When working with such a PN modulation, it is decided according to a PN code whether a pulse is sent or not. Since the PN code is known to the receiver, a target object may be detected by correlation. In an example method of the present invention, the radar pulses are received by an array having a plurality of antennas, the signal power is divided over at least two different reception branches, and different directional characteristics are generated in the various reception branches. Using a method of this type, it is possible, for example, to implement a precrash measurement and ACC stop & go simultaneously. The generation of different directional characteristics makes it possible to carry out an optimization with regard to the different demands in the various transmission branches. For example, a precrash measurement must be carried out in an extremely time-critical manner, while angle information, however, is of secondary importance. In contrast thereto, in the case of ACC stop & go, an angular resolution is generally necessary. By making different directional characteristics available, it is therefore possible to dispense with angle information in the reception branch for precrash, which permits an extremely time-critical measurement, while in the reception branch for ACC stop & go, the directional characteristic is selected so that angle information is obtained.

It may be advantageous if the radar pulses are emitted with a wide directional characteristic. In this way, the entire angular range to be detected is covered.

Preferably, a swivelling directional characteristic is generated in at least one reception branch. This reception branch in which the swivelling directional characteristic is generated may therefore be used for transmitting the angle information. The possibility thus exists, for example, of using the reception branch for ACC stop & go.

It may be advantageous if a wide directional characteristic is generated in at least one reception branch. For applications in which angle information is not of primary importance, a wide directional characteristic is sometimes sufficient. For example, the reception branch having the wide directional characteristic may therefore be used for precrash.

It may likewise be useful if different directional characteristics are generated in the various transmission branches. It is therefore possible to implement different directional characteristics on the transmitter side, as well, and thus to support the advantageous effects of parallel operation for different applications of the radar device. This is particularly advantageous when the radar device uses the same antennas for transmitting and receiving.

The different directional characteristics are preferably generated by a control unit. Such a control unit receives, for example, signals from the reception branches as input signals. It may also be responsible for the weighting in terms of amplitude and phase, and thus for generating the different directional characteristics.

It is particularly advantageous if delayed, modulated signals are generated from the carrier-frequency signal, and if the delayed, modulated signals are mixed with received signals. The radar device may therefore operate according to the correlation method. For instance, the distance of a target object may be inferred by correlation on the basis of the time delay from the emission to the reception of the radar pulses.

Usefully, the radar pulses are emitted by a single transmitting antenna. It is thus sufficient if different directional characteristics are generated by an antenna array on the receiver end, while a single transmitting antenna is provided on the transmitter end.

It may likewise be advantageous if the radar pulses are emitted by an array having a plurality of antennas. These antennas may be positioned separate from the antenna array on the receiver end, or they may be identical with the antenna array on the receiver end. Thus, there is great flexibility within the scope of the present invention with respect to the layout of transmitting and receiving antennas.

Moreover, it is particularly useful within the framework of the present invention if a high pulse repetition frequency is generated and if a low pulse repetition frequency is generated, The different pulse rates may therefore be utilized for different applications, the different pulse repetition frequencies being used on the various directional characteristics.

In this connection, it is particularly advantageous if the low pulse repetition frequency is produced by dividing the high pulse repetition frequency by a whole number. Pulse repetition frequencies are thereby advantageously available which have an integer relationship. Generating the various pulse repetition frequencies in this manner is also efficient.

Preferably, the radar pulses having the wide directional characteristic are emitted with the high pulse repetition frequency, and the radar pulses with the swivelling directional characteristic are emitted with the low pulse repetition frequency. For example, during this operation, it is possible to perform the time-critical measurement on the wide directional characteristic using a high pulse repetition frequency, while for the swivelling directional characteristic, which is preferably less time-critical within the framework of the present invention, it is possible to work with the lower pulse repetition frequency.

The radar pulses with the swivelling directional characteristic are preferably emitted using a pulse repetition frequency that is modulated by a PN ("pseudo-noise") code. When working with such a PN modulation, it is decided according to a PN code whether a pulse is sent or not. Since the PN code is known to the receiver, a target object may be detected by correlation.

Embodiments of the present invention are based on the surprising finding that a plurality of sensor applications may be implemented concurrently in one sensor using different directional characteristics. A flexible adaptation of the directional characteristic to the specific application may be carried out during the operation. The radar device of the present invention may provide an angular resolution, thereby making it possible to reduce the total number of sensors in a motor vehicle. The signal-to-noise ratio (S/N) is improved, since a plurality of antennas is used on the receiver end. Moreover, the signal-to-noise ratio may be increased in the manner that the average power is raised by increasing the pulse repetition frequency, such an increase in the pulse repetition frequency being possible depending on the practical application. A simultaneous increase of the pulse repetition frequency and a lowering of the peak pulse power, relevant for approval, may then lead to a retention of the signal-to-noise ratio, while at the same time, however, the electromagnetic compatibility of the radar device is increased. Improvement of the electromagnetic compatibility, that is to say, the ability of an electrical device to function satisfactorily in its electromagnetic environment without unacceptably influencing the environment to which other devices also belong, has advantages in view of the approval of the device before regulating authorities. It may likewise be advantageous that, given joint use of the antenna array as a transmitting and receiving antenna, the sensor on the whole is reduced in size.

DETAILED DESCRIPTION

Figure 1:
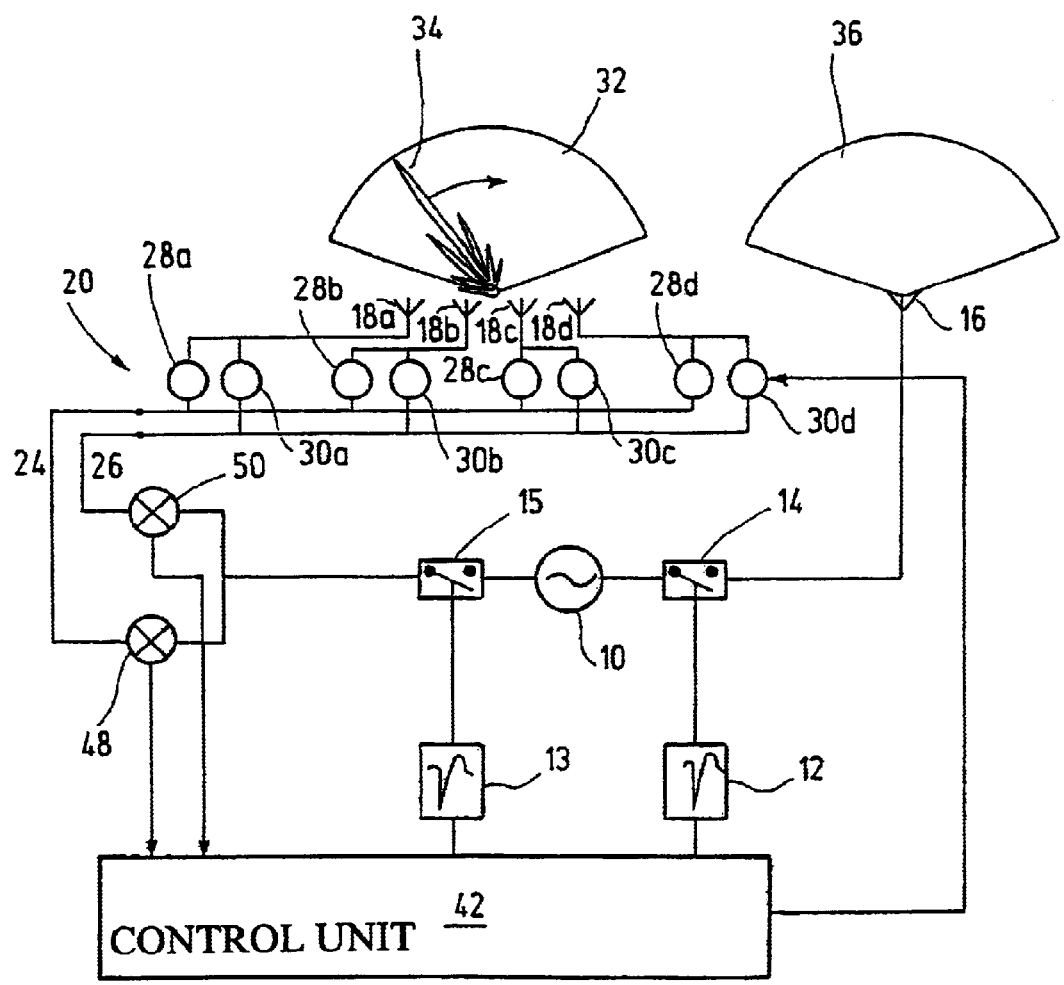
FIG. 1 shows a schematic representation of a first example embodiment of a radar device according to the present invention.

FIG. 1 shows a schematic representation of a first example embodiment of a radar device according to the present invention. A carrier frequency, e.g., 24 GHz, is generated by a local oscillator 10. This carrier frequency is modulated in a transmission branch. The modulation is carried out by a pulse-shaping element 12 which is connected to a control unit 42. This pulse-shaping element 12 actuates modulation means 14, so that modulated radar pulses having a specific pulse repetition frequency arrive at transmitting antenna 16. Transmitting antenna 16 radiates the radar pulses with a wide directional characteristic (radiation pattern) 36. After being reflected on a target object, the radar pulses ate received by a receiving device. A plurality of antennas 18a, 18b, 18c, 18d is provided which receive the reflected radar pulses. Due to the subsequent switching operation in the reception branch, antennas 18a, 18b, 18c, 18d are able to operate with different directional characteristics. Thus, for example, a wide directional characteristic 32 or a narrow directional characteristic 34 may be made available. In addition, narrow directional characteristic 34 may be swivelling. The received radar pulses are processed in such a way that the radar pulses are initially conveyed to a 3 dB-divider, so that different reception branches 24, 26 are obtained. In the first reception branch, means 28a, 28b, 28c, 28d are provided for modulating the phase and the amplitude of the received radar pulses. Means 30a, 30b, 30c, 30d for modulating the phase and the amplitude of the radar pulses are likewise provided in second reception branch 26. These means are influenced by control 42 in the manner that the specific directional characteristics are obtained in reception branches 24, 26. The resulting signals are supplied in first reception branch 24 to a first mixer 48. In second reception branch 26, the resulting signals are supplied to a second mixer 50. Both mixers 48, 50 receive modulated carrier-frequency signals, the modulation being effected by a pulse-shaping element 13, connected to control 42, and modulation means 15. In this way, a correlation is obtained, and finally the further evaluation of the radar pulses may be carried out, i.e. caused, in control 42.

For example, swivelling directional characteristic 34 on the receiver end may be used for an operation with regard to ACC stop & go. By the swivelling of narrow directional characteristic 34, angle information is obtained with respect to the target objects. Since the ACC stop & go operation is not generally particularly time-critical, there is sufficient time for swivelling the reception lobe. In contrast, the precrash operation is extremely time-critical, so that here wide directional characteristic 32 is used on the receiver end.

In the present example according to FIG. 1, two reception branches are provided. It is likewise possible to provide more than two reception branches; more than two directional characteristics may also be implemented. Therefore, the directional characteristics may be optimized depending on the practical application.

Moreover, it should be noted that the precrash and the ACC stop & go applications are only examples of applications which are typical for a time-critical and an angle-critical application, respectively. The present invention may likewise be utilized for the parallel, optimized operation of other practical applications.

Figure 2:
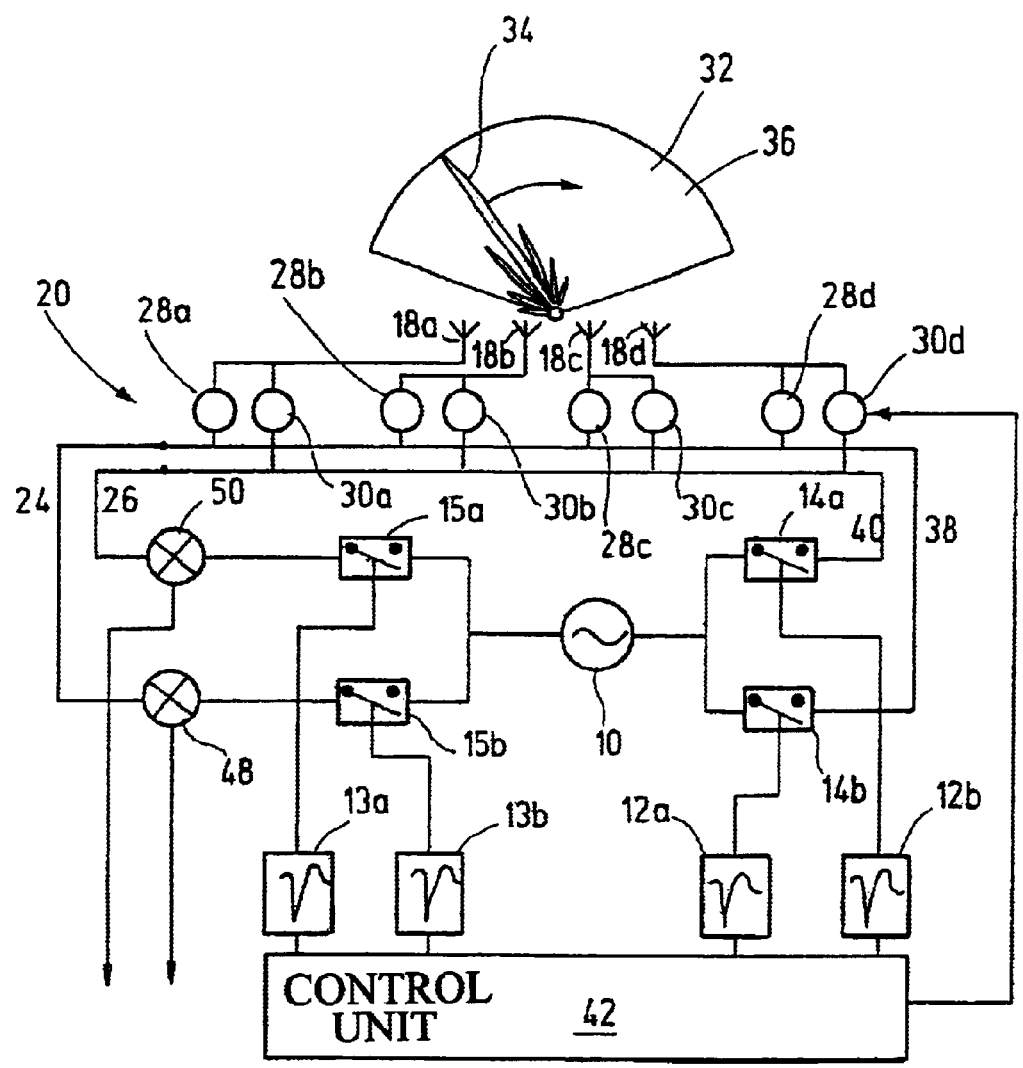
FIG. 2 shows a schematic representation of a second example embodiment of a radar device according to the present invention.

FIG. 2 shows a schematic representation of a further example embodiment of a radar device according to the present invention. Elements which correspond to those from FIG. 1 are designated by the same reference numerals. In the specific embodiment according to FIG. 2, antenna array 18a, 18b, 18c, 18d is used both for transmitting and for receiving operation. Preferably, different pulse repetition frequencies are used on the various directional characteristics. These different pulse repetition frequencies are realized by the interaction of control 42 with pulse-shaping elements 12a, 12b and modulation means 14a, 14b, or by the interaction of control unit 32 with pulse-shaping elements 13a, 13b and modulation means 15a, 15b. Two transmission branches 38, 40 are provided, the different pulse repetition frequencies being selected so that the monomode range of the radar device is not violated. In general, the monomode range of a radar device is inversely proportional to the pulse repetition frequency. For example, if a pulse repetition frequency of 50 MHz is present, a monomode range of 3 m results. This monomode range may be sufficient to make an adequate precrash operation available. However, the monomode range of 3 m is generally not sufficient for an operation with ACC stop & go. Therefore, it is possible within the scope of the present invention to operate the wide directional characteristic with a high pulse repetition frequency of, for example, 50 MHz, while a further lower pulse repetition frequency is produced by dividing the high pulse repetition frequency by a whole number. This low pulse repetition frequency is now transmitted on narrow, swivelling directional characteristic 34. If reception pulses having the higher pulse repetition frequency, which were transmitted via the wide directional characteristic, are now received at the output of the narrow directional characteristic, then these errors may nevertheless be eliminated by comparing both channels and based on the different power levels. The monomode range may be increased by switchover of the two pulse repetition frequencies.

In this connection, a further possibility of the modulation of radar pulses is especially worth mentioning. This lies in the emitting of radar pulses, which were modulated with a pseudo-noise code (PN code) with a high pulse repetition frequency, this PN modulation being used on the narrow directional characteristic. Either a pulse is emitted or not, in accordance with the PN code. Since the PN sequence is known to the receiver, the object may be detected by correlation.

Thus, for instance, the following scenario may come about with respect to the precrash and ACC stop & go applications indicated by way of example. For the time-critical application (precrash), distance range R1 may be scanned, for example, ten times within a time interval T1. In the same interval T1, a less time-critical application (ACC stop & go) may at the same time scan a larger distance range R2 (R2>R1) one time each at various swivel angles.

The preceding description of the exemplary embodiments according to the present invention is provided only for purposes of illustration and not for the purpose of limiting the present invention. Various changes and modifications are possible within the framework of the present invention, without departing from the scope of the present invention or its equivalents.

What is claimed is:

1. A radar device, comprising
   an arrangement for generating a carrier-frequency signal;
   an arrangement for shaping pulses coupled to the arrangement for generating the carrier-frequency signal;
   an arrangement for generating modulated radar signals from the carrier-frequency signal;
   an arrangement for emitting the modulated radar signals as radar pulses;
   an arrangement for receiving radar pulses including an antenna array, the antenna array including a plurality of antennas;
   an arrangement for processing the received radar pulses including an arrangement for dividing a signal power of the radar pulses over at least two different reception branches; and
   an arrangement for generating different directional characteristics in the at least two different reception branches.

2. The radar device as recited in claim 1, wherein the arrangement for emitting the modulated radar signals has a wide directional characteristic.

3. The radar device as recited in claim 1, wherein the arrangement for generating different directional characteristics generates a swivelling directional characteristic in at least one of the reception branches.

4. The radar device as recited in claim 1, wherein the arrangement for generating different directional characteristics generates a wide directional characteristic in at least one of the reception branches.

5. The radar device as recited in claim 1, further comprising:
   at least two different transmission branches coupled to the arrangement for emitting; and
   an arrangement for generating different directional characteristics in the transmission branches.

6. The radar device as recited in claim 1, wherein the arrangement for generating different directional characteristics in the reception branches includes a control unit.

7. The radar device as recited in claim 1, wherein the arrangement for generating different directional characteristics in the transmission branches includes a control unit.

8. The radar device as recited in claim 1, further comprising:
   an arrangement for generating delayed modulated signals from the carrier-frequency signal; and
   an arrangement for mixing the delayed modulated signals with the received radar pulses.

9. The radar device as recited in claim 1, wherein the arrangement for emitting the modulated radar signals is a single transmitting antenna.

10. The radar device as recited in claim 1, wherein the arrangement for emitting the modulated radar signals includes an antenna array including a plurality of antennas.

11. The radar device as recited in claim 5, further comprising:
    an arrangement for generating a high pulse repetition frequency coupled to at least one of the transmission branches; and
    an arrangement for generating a low pulse repetition frequency coupled to at least one of the transmission branches.

12. The radar device as recited in claim 11, wherein the low pulse repetition frequency is produced by dividing the high pulse repetition frequency by a whole number.

13. The radar device as recited in claim 1, wherein the arrangement for emitting the modulated radar signals emits radar pulses having a wide directional characteristic with a high pulse repetition frequency and emits radar pulses having a swivelling directional characteristic with a low pulse repetition frequency.

14. The radar device as recited in claim 3, wherein the arrangement for emitting emits the radar pulses with a pulse repetition frequency this is modulated by a pseudo-noise code.

15. A method for operating a radar device, comprising the steps:
    generating a carrier-frequency signal;
    shaping pulses;
    generating modulated radar signals from the carrier-frequency signal;
    emitting the modulated radar signals as radar pulses;
    receiving radar pulses using an antenna array;
    dividing a signal power of the received radar pulses over at least two different reception branches; and
    generating different directional characteristics in the at least two different reception branches.

16. The method as recited in claim 15, wherein the emitting step includes emitting the modulated radar signals with a wide directional characteristic.

17. The method as recited in claim 15, further comprising:
    generating a wide directional characteristic in at least one of the reception branches.

18. The method as recited in claim 15, further comprising:
    generating a swivelling directional characteristic in at least one of the reception branches.

19. The method as recited in claim 15, further comprising:
    generating different directional characteristics in at least two different transmission branches.

20. The method as recited in claim 15, wherein the different directional characteristics in the at least two different reception branches are generated by a control unit.

21. The method as recited in claim 19, wherein the different directional characteristics in the at least two different transmission branches are generated by a control unit.

22. The method as recited claim 15, further comprising:
    generating delayed modulated radar signals from the carrier-frequency signal; and
    mixing the delayed modulated radar signals with the received radar pulses.

23. The method as recited in claim 15, wherein the modulated radar signals are emitted by a single transmitting antenna.

24. The method as recited in claim 15, wherein the modulated radar signals are emitted by an antenna array.

25. The method as recited in claim 15, further comprising:
generating a high pulse repetition frequency, and
generating a low pulse repetition frequency.

26. The method as recited in claim 25, wherein the low pulse repetition frequency is produced by dividing the high pulse repetition frequency by a whole number.

27. The method as recited in claim 15, further comprising:
emitting radar pulses having a wide directional characteristic with a high pulse repetition frequency; and
emitting radar pulses having a swivelling directional characteristic with a low pulse repetition frequency.

28. The method as recited in claim 15, further comprising:
emitting radar pulses having a swivelling directional characteristic with a pulse repetition frequency modulated by a psuedo-noise code.

* * * * *

UNITED STATES PATENT AND TRADEMARK OFFICE
CERTIFICATE OF CORRECTION

PATENT NO.     : 6,940,447 B2
DATED          : September 6, 2005
INVENTOR(S)    : Handjojo et al.

It is certified that error appears in the above-identified patent and that said Letters Patent is hereby corrected as shown below:

Column 2,
Line 22, after "Unfortunately" insert -- , --.

Column 16,
Line 59, delete "bidirectional" and insert -- bi-directional --.

Column 17,
Line 57, after "$T_a$" insert -- , --.

Column 28,
Line 61, after "246" insert -- . --.

Column 29,
Line 33, after "246" insert -- . --.

Column 31,
Line 17, before "input" insert -- the --.
Line 17, after "input" delete ";" and insert -- , --.

Signed and Sealed this

Fifteenth Day of November, 2005

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,940,447 B2 | |
| APPLICATION NO. | : 10/416751 | |
| DATED | : September 6, 2005 | |
| INVENTOR(S) | : Klaus Voigtlaender et al. | |

It is certified that error appears in the above-identified patent and that said Letters Patent is hereby corrected as shown below:

This certificate supersedes certificate of correction issued November 15, 2005, the number was erroneously mentioned and should be vacated since no certificate of correction was granted for this patent number.

Signed and Sealed this

Eleventh Day of July, 2006

JON W. DUDAS
*Director of the United States Patent and Trademark Office*